United States Patent [19]

Thomas et al.

[11] 4,024,111

[45] May 17, 1977

[54] CROSS-LINKABLE COMPOUNDS BASED ON SATURATED POLYESTERS

[75] Inventors: Philippe Thomas, Boulogne Billancourt; Jacques Meyer; Jacques Marie d'Avigneau, both of Paris, all of France

[73] Assignee: Rhone-Poulenc Industries, Paris, France

[22] Filed: Dec. 15, 1975

[21] Appl. No.: 640,479

[30] Foreign Application Priority Data

Dec. 24, 1974 France .............................. 74.42685

[52] U.S. Cl. ........................... 260/75 T; 260/47 C; 260/75 UA
[51] Int. Cl.$^2$ ................. C08G 63/20; C08G 63/46; C08G 63/76
[58] Field of Search ........... 260/75 T, 75 UA, 47 C

[56] References Cited

UNITED STATES PATENTS

| 3,652,502 | 3/1972 | Jackson et al. ................... 260/75 R |
| 3,692,744 | 9/1972 | Rich et al. ........................ 260/75 T |
| 3,725,329 | 9/1973 | Jacoby et al. ................. 260/32.8 R |

*Primary Examiner*—Lucille M. Phynes
*Attorney, Agent, or Firm*—McDougall, Hersh & Scott

[57] ABSTRACT

The invention relates to compounds based on saturated polyester and cross-linking agent. The compositions comprise a saturated polyester with terminal hydroxyl groups and a cross-linking agent consisting of a dianhydride with ester groups, the product of reaction between a trimellitic anhydride and a diol. Use of the compounds as a binder for powder paints applicable to the automobile, electrical household goods, agricultural machinery and lead industries.

9 Claims, No Drawings

CROSS-LINKABLE COMPOUNDS BASED ON SATURATED POLYESTERS

The invention concerns compounds based on saturated polyesters and cross-linking agents, for use as binders for powder paints.

The use of powder paints is tending to spread, so it has been proposed that various resins, usually associated with cross-linking agents, should be used as binders. However, coatings obtained with such paints have some disadvantages. Coatings based on cross-linked epoxy resins show poor resistance to weathering, ultra-violet light and solvents. Coatings where the binders are saturated polyesters with terminal hydroxyl groups, cross-linked by hexamethylolmelamine ethers, show little resistance to solvents and weathering and have poor mechanical properties. The same polyesters cross-linked by isocyanates give coatings with very poor resistance to solvents and furthermore, if the isocyanate is aromatic, the coating will turn yellow in the presence of ultra-violet rays. If the binders are saturated polyesters with acid end groups, cross-linked by epoxy resins, the coatings will have a poor surface.

By cross-linking at temperatures not over 200° C, the compounds according to the invention make it possible to obtain coatings with excellent resistance to solvents, weathering and ultra-violet rays, good resistance to bending and shock and very satisfactory surface appearance, adhesion and deep drawing properties.

The compounds comprise a saturated polyester with terminal hydroxyl groups and a cross-linking agent. They are characterized in that the polyester has a softening temperature of from 70° to 130° C, a hydroxyl number from 150 to 250 and an acid number below 10, and that the cross-linking agent comprises a dianhydride with ester groups (functions), is the product of a reaction between trimellitic anhydride and a diol, and has a softening temperature of 60° to 130° C.

The polyester used is prepared in known manner, by reacting an aromatic dicarboxylic acid or a lower alkyl ester of aromatic dicarboxylic acid with a diol, in theoretical proportions according to the required hydroxyl number.

The aromatic dicarboxylic acids are represented more particularly by terephthalic and isophathalic acid, used alone or in admixture or with saturated aliphatic dicarboxylic acids, such as adipic, succinic or sebacic acid.

Furthermore, in order to increase the number of branches in the polyester, it is possible to associate the dicarboxylic acids with acids having more than two aromatic or aliphatic carboxylic groups. Examples of these are trimellitic acid and anhydride, pyromellitic acid and anhydride and butanetetracarboxylic acid.

The diols which can be used to obtain the polyester include: ethylene-glycol, diethylene-glycol, propylene-glycol, dipropylene-gylcol, butanediols, bishydroxyethyl-bisphenol A, neopentyl-glycol and hydrogenated bisphenol A. These diols are either used alone or mixed with one another or with other diols.

In order to increase the number of branches and the number of hydroxyl end groups in the polyester, it is advisable to associate the diols with triols, such as glycerol, trimethylolpropane and trihydroxyethylisocyanurate.

It is obvious that, if the polyester is to be prevented from cross-linking during its preparation, substances with more than two acid groups or more than two alcohol groups can be used only within the limits prescribed by Flory's law (Turner Alfrey, Mechanical Behavior of High Polymers, Interscience Publishers — Volume VI, page 268).

The polyester used may alternatively be a polyester obtained by reacting ethylene-glycol polyterephthalate of high molecular weight in the form of granules, films, fibers, etc. with a triol such as glycerol, trimethylolpropane or trihydroxyethyl isocyanurate.

The polyester forming the compounds is a colorless substance with a softening temperature of from 70 ° to 130 ° C, a hydroxyl number from 150 to 250 and an acid number as low as possible and always less than 10.

The cross-linking agent, which is the other constituent of the compounds, is the product of a reaction between trimellitic anhydride and an aliphatic diol containing 2 to 10 carbon atoms, such as ethylene-glycol, diethylene-glycol, propylene-glycol, dipropylene-glycol or neopentyl-glycol, in quantities such that the anhydride/diol molar ratio is 2/1 to 1.5. The reaction is carried out at a temperature from 180 ° to 250 ° C and preferably from 220 °–240 ° C, until no more water is liberated. The product obtained comprises a majority of dianhydride-ester mixed with substances having an acid group. Its softening temperature is approximately 60 ° to 130 ° C, preferably 100 ° to 120 ° C and its acid number is very close to the theoretical one, allowing for the nature and quantity of diol used.

The compounds comprising the polyester and cross-linking agent can be cross-linked by polyaddition and poly-condensation at temperatures of from 140 ° to 200 ° C for periods ranging from 5 to 30 minutes.

When the compounds are used as binders for powder paints, the polyester and cross-linking agent are mixed in proportions corresponding to the respective hydroxyl and acid numbers of the two constituents, by any method conventionally used in the manufacture of powder paints, e.g. by spraying or by successive rapid cold-mixing, extruding, crushing, grinding and sifting operations.

Spreading agents, which change the surface tension of the paint, are added during the mixing process in quantities ranging from 0.1% to 1% by weight of the compound. These agents, which are commonly used, are represented particularly by acrylic polymers and silicon fluids.

Any of the additives traditionally employed in the paint industry may also be added, such as pigments, colors and fillers.

The mixtures obtained are then applied as a coating by any known methods, e.g. by means of a fluidized bath or electro-static spraying onto rigid surfaces of any materials which will tolerate temperatures of about 200 ° C, such as metal or glass. The coated materials are then subjected to temperatures of 140 ° to 200 ° C for 5 to 30 minutes to bring about cross-linking of the compound.

The coatings have the following properties:
- Thickness: 40 to 100 $\mu$m
- Surface appearance: good surface tension; glossy, matt or satin surface
- Resistance to methylethylketone: (one drop of methyl ethylketone is deposited on the coating, then the area is scratched with a finger-nail for long enough to remove the coating) — a period of over 3 minutes
- Accelerated aging: (exposure in a xenotest and recording when yellowing begins) — over 800 hours

- Adhesion: (French Standard T 30038) — at least 4
- Deep drawing (French Standard T 30019) — at least 7.
- Shock resistance: (French Standard T 30039 for a mass of 1 kg dropping 50 cm) — no crazing or unsticking on impact = good
- Bending (French Standard T 30040 — bending a plate with a transversely scored coating through 180° mm on a mandrel 8 mm in diameter) — no deterioration at the bend = good.

The compounds according to the invention are paint binders which are particularly appropriate for the automobile, electrical household goods, agricultural machinery and lead industries.

Some examples of the invention follow; they are given purely by way of illustration and not by way of limitation of the invention.

EXAMPLE 1

The polyester used is prepared by reacting 2,490 g (15 moles) of terephthalic acid, 725 g (11.16 moles) of ethylene glycol, 288 g (1.2 mole) of hydrogenated bisphenol A and 552 g (6 moles) of glycerol at 240° C in a nitrogen atmosphere. The polyester thus obtained is perfectly clear and colorless and has a softening temperature of 80° C, an acid number of 7 and a hydroxyl number of 190.

The cross-linking agent is prepared by bringing 576 g (3 moles) of trimellitic anhydride to 230° C in a nitrogen atmosphere; 93 g (1.5 mole) of ethylene glycol is gradually added to it over 15 minutes. After two hours, no more water is being given off. The product obtained has a softening temperature of 110° C and an acid number of 518 in an aqueous medium and 336 in an alcohol medium, corresponding to a dianhydride yield of 65%.

1,000 g of the ground polyester, 290 g of the cross-linking agent, 770 g of rutile titanium dioxide, commercially available under the name of "CL 220", and 7 g of spreading agent, based on acrylic polymer and known by the trade name of "Modaflow", are mixed in a quick-action mixer, then extruded. The extrusion product is cooled, then ground and finally sifted. The powder consists of particles with a maximum diameter of 100 μm. It is applied to the surface of a metal plate by electrostatic spraying, in a uniform film of about 50 μm. The plate is next heated for 30 minutes to 180° C, then cooled.

In a first comparative test a metal plate is prepared, as described above, with a mixture of 75 g of polyester prepared from 1 mole of terephthalic acid, 1 mole of neopentylglycol and 0.08 mole of trimethylolpropane; 25 g of a cross-linking agent obtained by reacting 2 moles of isophorone diisocyanate, 1 mole of diethylene glycol and 2 moles of caprolactam; 0.55 g of "Modaflow" and 60 g of "CL 220 °."

In a second comparative test, a metal plate is coated in the same way with a mixture of 100 g of a condensate of epichlorohydrin and bisphenol A (epoxy equivalent 900), 4 g of dicyandiamide, 0.57 g by weight of "Modaflow" and 62 g of "CL 220." Cross-linking takes place at 180° C for 20 minutes.

The characteristics of the 3 tests are set out in the following table:

| Characteristics | Example 1 | Comparative test 1 | Comparative test 2 |
|---|---|---|---|
| Surface appearance | glossy - taut surface | glossy - taut surface | glossy - slight orange peel effect |
| Resistance to methylethylketone | > 3 min | 10 sec | 1 min |
| Accelerated aging | > 800 hrs | > 800 hrs | 250 hrs |
| Adhesion | 4 | 4 | 3 |
| Deep drawing | 7 mm | 8 mm | 10 mm |
| Resistance to shock | good | good | good |
| Bending | good | good | good |

EXAMPLE 2

Example 1 is repeated, except that the polyester is prepared from 2,910 g (15 moles) of methyl terephthalate instead of terephthalic acid, at 220° C and in the presence of 22 g of butyl titanate. After reaction for 5 hours, 960 g of methanol is collected and the polyester obtained has a softening temperature of 80° C, an acid number of 0 and a hydroxyl number of 190.

The coating has the same characteristics as that in Example 1.

EXAMPLE 3

Example 1 is repeated with a polyester prepared by reacting 1,992 g (12 moles) of terephthalic acid, 1,488 g (24 moles) of ethylene glycol and 768 g (4 moles) of trimellitic anhydride at 220° C in a nitrogen atmosphere for 12 hours. The resin obtained has a softening temperature of 80° C, an acid number of 3 and a hydroxyl number of 150.

The coating has the following properties:

| | |
|---|---|
| Surface appearance: glossy - taut surface | |
| Resistance to methylethylketone: | > 3 min |
| Accelerated aging | > 800 hrs |
| Adhesion | 4 |
| Deep drawing: | 7 mm |
| Resistance to shock | good |
| Bending | good |

EXAMPLE 4

The polyester is prepared by reacting 2,450 g (15 moles) of terephthalic acid with 725 g (11.7 moles) of ethylene glycol, 379 (1.2 mole) of bishydroxyethyl bisphenol A and 552 g (6 moles) of glycerol at 200°–240° C. The polyester obtained, which is perfectly clear, has a softening temperature of 75° C, an acid number of 7 and a hydroxyl number of 190.

The cross-linking agent is prepared by a reaction at 230° C between 576 g (3 moles) of trimellitic anhydride and 111.6 g (1.8 mole) of ethylene glycol, which is introduced over a period of 15 minutes. When no more water is given off, the reaction product is cooled. It has a softening temperature of approximately 110° C and an acid number of 455 in an aqueous medium and 280 in an alcohol medium, i.e., a dianhydride yield of 82%.

1,000 g of ground polyester, 430 g of ground dianhydride, 850 g of rutile titanium dioxide and 11 g of "Modeflow" are intimately mixed, then worked and applied as in Example 1.

The properties of the coating are as follows:
- Surface appearance: glossy - taut surface
- Resistance to methylethylketone: > 3 mins

- Accelerated aging: 800 hrs
- Adhesion: 4
- Deep drawing: 7
- Resistance to shock: good
- Bending: good

We claim:

1. A binder comprising a saturated polyester with terminal hydroxyl groups and a cross-linking agent, characterized in that the polyester has a softening temperature within the range of 70° to 130° C, a hydroxyl number within the range of 150 to 250 and an acid number below 10, and that the cross-linking agent comprises a dianhydride with ester groups, which is the product of a reaction between trimellitic anhydride and a diol and which has a softening temperature within the range of 60° to 130° C.

2. A binder according to claim 1, characterized in that the polyester is the product of a reaction between at least one dicarboxylic acid selected from the group consisting of aromatic dicarboxylic acid and lower alkyl ester of aromatic dicarboxylic acid with one or more diols.

3. A binder according to claim 2, characterized in that at least one acid selected from the group consisting of saturated aliphatic acid and aromatic or aliphatic acid with more than two carboxylic groups are associated with the aromatic dicarboxylic acid.

4. A binder according to claim 2, characterized in that one or more triols are associated with the diol.

5. A binder according to claim 1, characterized in that the polyester is the product of a reaction between ethylene glycol polyterephthalate of high molecular weight and a triol.

6. A binder according to claim 1, characterized in that the cross-linking agent is obtained by reacting trimellitic anhydride with a diol at a temperature within the range of 180° to 250° C and in the molar ratio trimellitic anhydride/diol of 2/1 to 1.5.

7. A binder according to claim 6, characterized in that the diol is an aliphatic diol having 2 to 10 carbon atoms.

8. A binder according to claim 1, characterized in that their cross-linking temperature is from 140° to 200° C. for from 5 to 30 minutes.

9. A method of obtaining the binder of claim 1, comprising mixing a polyester having terminal hydroxyl groups with the cross-linking agent formed by reacting trimellitic anhydride with a diol at a temperature within the range of 180° to 250° C and in the molar ratio of 2 moles of trimellitic anhydride to 1 to 1.5 moles of the diol.

* * * * *